United States Patent
Lee et al.

(10) Patent No.: US 9,922,731 B2
(45) Date of Patent: Mar. 20, 2018

(54) RESISTANCE WELDING OF AN END CAP FOR NUCLEAR FUEL RODS

(71) Applicant: BWXT mPower, Inc., Charlotte, NC (US)

(72) Inventors: Jeffrey T Lee, Forest, VA (US); Earl B Barger, Goode, VA (US); Scott L Fitzner, Appomattox, VA (US); Michael J Nilles, Lynchburg, VA (US)

(73) Assignee: BWXT mPower, Inc., Charlotte, NC (US)

( * ) Notice: Subject to any disclaimer, the term of this patent is extended or adjusted under 35 U.S.C. 154(b) by 476 days.

(21) Appl. No.: 13/712,742

(22) Filed: Dec. 12, 2012

(65) Prior Publication Data

US 2013/0272484 A1    Oct. 17, 2013

Related U.S. Application Data

(60) Provisional application No. 61/625,410, filed on Apr. 17, 2012.

(51) Int. Cl.
  *G21C 3/10*    (2006.01)
  *G21C 21/02*   (2006.01)
  *B23K 11/00*   (2006.01)

(52) U.S. Cl.
  CPC ............ *G21C 3/10* (2013.01); *B23K 11/002* (2013.01); *G21C 21/02* (2013.01); *Y02E 30/40* (2013.01)

(58) Field of Classification Search
  CPC .......... G21C 3/10; G21C 21/02; G21C 21/08; B23K 11/02

(Continued)

(56) References Cited

U.S. PATENT DOCUMENTS

| 3,836,431 A | 9/1974 | Flipot et al. |
| 4,097,712 A | 6/1978 | Bezold |

(Continued)

FOREIGN PATENT DOCUMENTS

| CN | 85101508 A | 1/1987 |
| CN | 1672219 A  | 9/2005 |
| CN | 1906702 A  | 1/2007 |

OTHER PUBLICATIONS

International Search Report and Written Opinion for PCT/US2013/026457 dated Nov. 5, 2013.

(Continued)

*Primary Examiner* — Sharon M Davis
(74) *Attorney, Agent, or Firm* — Nelson Mullins Riley & Scarborough LLP

(57) ABSTRACT

An open end of a cladding tube of a nuclear fuel rod is plugged with an end plug having a main body and a cylindrical bond portion extending from the main body and terminating in a cladding seat with reduced diameter compared with the cylindrical bond portion. The plugging includes clamping the open end of the cladding tube against the cladding seat of the end plug and, while clamping, applying electrical current between the end plug and the open end of the cladding tube so as to force the open end of the cladding tube over the cladding seat and slide over the cylindrical bond portion of the end plug and to generate a resistance weld between a cylindrical bonding surface of the cylindrical bond portion of the end plug and the inside surface of the open end of the cladding tube.

13 Claims, 4 Drawing Sheets

(58) Field of Classification Search
USPC .................................................. 219/78.01
See application file for complete search history.

(56) References Cited

U.S. PATENT DOCUMENTS

| | | | |
|---|---|---|---|
| 4,587,094 A * | 5/1986 | Bucher | 376/451 |
| 4,837,419 A | 6/1989 | Boatwright et al. | |
| 4,857,691 A | 8/1989 | Boatwright | |
| 4,865,804 A * | 9/1989 | McGeary et al. | 376/451 |
| 4,885,127 A | 12/1989 | Yokoyama | |
| 4,895,698 A | 1/1990 | DeMario | |
| 4,923,669 A | 5/1990 | DeMario | |
| 4,957,697 A | 9/1990 | Wada | |
| 4,966,745 A | 10/1990 | Widener et al. | |
| 4,971,750 A | 11/1990 | Duncan et al. | |
| 4,990,304 A | 2/1991 | Rylatt | |
| 4,994,233 A | 2/1991 | Freeman | |
| 4,996,018 A | 2/1991 | Bhatt et al. | |
| 5,009,837 A | 4/1991 | Nguyen et al. | |
| 5,024,806 A | 6/1991 | Cioffi et al. | |
| 5,030,413 A | 7/1991 | Knierriem et al. | |
| 5,043,134 A | 8/1991 | Widener et al. | |
| 5,068,083 A | 11/1991 | John, Jr. et al. | |
| 5,158,740 A | 10/1992 | Boatwright | |
| 5,207,980 A | 5/1993 | Gilmore et al. | |
| 5,265,137 A | 11/1993 | Busch | |
| 5,268,948 A | 12/1993 | Church et al. | |
| 5,282,231 A | 1/1994 | Adams et al. | |
| 5,282,233 A | 1/1994 | Bryan | |
| 5,299,246 A | 3/1994 | Bryan | |
| 5,367,549 A | 11/1994 | Hatfield | |
| 5,374,800 A | 12/1994 | Yoneda | |
| 5,375,756 A | 12/1994 | Haughton et al. | |
| 5,401,933 A | 3/1995 | Yoneda | |
| 5,436,945 A | 7/1995 | Weisel et al. | |
| 5,513,230 A * | 4/1996 | Crede et al. | 376/261 |
| 5,513,234 A | 4/1996 | Rottenberg | |
| 5,640,434 A | 6/1997 | Rottenberg | |
| 6,055,288 A | 4/2000 | Schwirian | |
| 6,088,420 A | 7/2000 | Yokoyama et al. | |
| 6,810,099 B2 | 10/2004 | Nakamaru et al. | |
| 6,895,067 B2 | 5/2005 | Borum et al. | |
| 7,280,946 B2 | 10/2007 | Russell, II et al. | |
| 7,424,085 B2 | 9/2008 | Hertz et al. | |
| 7,424,412 B2 | 9/2008 | Kropaczek et al. | |
| 7,428,479 B2 | 9/2008 | Boer et al. | |
| 7,453,972 B2 | 11/2008 | Hellandbrand, Jr. et al. | |
| 7,526,058 B2 | 4/2009 | Fawcett et al. | |
| 7,548,602 B2 | 6/2009 | Smith, III et al. | |
| 7,574,337 B2 | 8/2009 | Kropaczek et al. | |
| 8,107,585 B2 | 1/2012 | Blaudin de the | |
| 2003/0123600 A1 | 7/2003 | Hesketh et al. | |
| 2003/0169839 A1 | 9/2003 | Matteson | |
| 2005/0069080 A1 | 3/2005 | Goldenfield et al. | |
| 2006/0153327 A1 | 7/2006 | Jiang | |
| 2006/0222140 A1 | 10/2006 | Aleshin et al. | |
| 2006/0251205 A1 | 11/2006 | Balog | |
| 2007/0133732 A1 | 6/2007 | Nakayama et al. | |
| 2007/0206717 A1 | 9/2007 | Conner et al. | |
| 2007/0242792 A1 | 10/2007 | Blaudin De The | |
| 2008/0084957 A1 | 4/2008 | Aleshin et al. | |
| 2009/0032178 A1 | 2/2009 | Feinroth | |

OTHER PUBLICATIONS

Rudling, Peter, Alfred Strasser, and Friedrich Garzarolli, Welding of Zirconium Alloys, A.N.T. International, IZN A7 Special Topic Report, Oct. 2007.

Advanced Fuel Pellet Materials and Fuel Rod Design for Water Cooled Reactors, IAEA—International Atomic Energy Agency, IAEA-TECDOC-1654, Nov. 2009.

Office Action dated Feb. 29, 2016 for Chinese Application No. 201380031505.8.

European Extended Search Report dated Nov. 26, 2015 for EP Application No. 13784868.5.

* cited by examiner

RESISTANCE WELDING OF AN END CAP FOR NUCLEAR FUEL RODS

RELATED APPLICATIONS

This application claims the benefit of U.S. Provisional Application No. 61/625,410, filed on Apr. 17, 2012. U.S. Provisional Application No. 61/625,410, filed on Apr. 17, 2012, is hereby incorporated by reference in its entirety into the specification of this application.

BACKGROUND

The following relates to the welding arts, nuclear reactor arts, nuclear fuel rod arts, nuclear power generation arts, and related arts.

In a typical nuclear reactor, the reactor core generally includes a number of fuel assemblies each of which is made up of an array of fuel rods. Each fuel rod includes a tubular cladding containing fuel pellets comprising fissile material. The cladding is sealed by upper and lower end caps or plugs. The nuclear reactor core is made up of an array of such fuel rods, and is disposed in a pressure vessel containing primary coolant (typically water, although heavy water or another coolant is also contemplated). The primary coolant flows through the nuclear reactor core and is heated by the radioactive core. In a typical boiling water reactor (BWR) configuration, the heated coolant boils to form primary coolant steam that is piped out of the pressure vessel and used to drive a turbine. In a typical pressurized water reactor (PWR) configuration, the primary coolant remains in a subcooled state and is piped through steam generators located outside of the vessel to heat secondary coolant that drives a turbine. In a variant integral PWR configuration, the steam generators are located inside the pressure vessel and the secondary coolant is pumped into the steam generators.

In general, each fuel rod includes a column of nuclear fuel pellets loaded into a cladding tube, and end plugs secured to opposite (e.g., bottom and top) ends of the tube. The end plugs should provide a reliable seal to prevent leakage of primary coolant into the fuel rods. In known approaches, the top and bottom end plugs are girth or butt welded to the opposite ends of the tube, for example by fusion welding or solid state welding.

Resistance welding of the end plugs to the cladding is also known wherein a cladding tube is butted against an end plug. In this approach, a high current is passed between the cladding and the end plug which is compressively loaded. Resistance at the interface between the end plug and the cladding generates localized heating resulting in a diffusion bond. While resistance welding has many desirable attributes, the process has some shortcomings. For example, non-destructive weld examination is generally not feasible. Bond quality can also be susceptible to some contaminates, in some cases, with no means of detection. Weld upset, or flash, typically must be mechanically removed or suppressed in a post-weld process that complicates the processing.

SUMMARY

In accordance with one aspect, a method comprises plugging an open end of a cladding tube of a nuclear fuel rod with an end plug having a main body and a cylindrical bond portion extending from the main body and terminating in a cladding seat with reduced diameter compared with the cylindrical bond portion. The plugging includes clamping the open end of the cladding tube against the cladding seat of the end plug and, while clamping, applying electrical current between the end plug and the open end of the cladding tube. The combination of the clamping and the applied electric current is effective to force the open end of the cladding tube over the cladding seat and to slide over the cylindrical bond portion of the end plug and to generate a resistance weld between a cylindrical bonding surface of the cylindrical bond portion of the end plug and the inside surface of the open end of the cladding tube. In some embodiments the cladding seat includes a cylindrical seat portion of reduced diameter compared with the cylindrical bond portion and an abrupt or gradual annular step between the cylindrical seat portion of the end plug and the cylindrical bond portion of the end plug. In some embodiments the annular step is about 0.002 inches. In other embodiments the annular step is greater than 0.002 inches. In yet other embodiments the annular step is not utilized. In some embodiments the cladding seat comprises a chamfered or frustoconical end of the cylindrical bond portion of the end plug. In some embodiments the end plug includes a slide stop defined between the main body of the end plug and the cylindrical bond portion of the end plug, the slide of the open end of the cladding tube over the cylindrical bond portion of the end plug being stopped by the slide stop. For example, the slide stop may be an abrupt or gradual annular step between the cylindrical bond portion of the end plug and the main body of the end plug. In some such embodiments, the slide stop includes an annular groove that receives buildup material displaced during the slide of the open end of the cladding tube over the cylindrical bond portion of the end plug. In other embodiments the distance of travel is controlled by a travel length process.

In accordance with another aspect, a method includes operations as set forth in the immediately preceding paragraph, and further includes the operation of loading fuel pellets comprising fissile material into the cladding tube. The method may further include repeating the loading and the plugging for each of a plurality of cladding tubes to generate a plurality of assembled nuclear fuel rods, and constructing a fuel assembly comprising an array of the assembled nuclear fuel rods.

In accordance with another aspect, a nuclear fuel rod includes: an end plug having a cylindrical bond portion, a tapered tip at one end of the end plug, and a seat portion of reduced diameter compared with the cylindrical bond portion at the opposite end of the end plug; a cladding tube having an end plugged by the cylindrical bond portion of the end plug with the seat portion disposed inside the plugged end of the cladding tube and the tapered tip extending outside of the plugged end of the cladding tube; and a weld bonding the cylindrical bond portion of the end plug and the inside surface of the plugged end of the cladding tube. In some embodiments the seat portion comprises a cylindrical seat portion of reduced diameter compared with the cylindrical bond portion. In some embodiments seat portion comprises a chamfered or frustoconical end of the cylindrical bond portion of the end plug. In some embodiments the end plug further has a cylindrical main body disposed between the cylindrical bond portion and the tapered tip, the cylindrical main body extending outside of the plugged end of the cladding tube and terminating in the tapered tip. In some such embodiments the cylindrical main body has a larger diameter than the cylindrical bond portion and an abrupt or gradual annular step is defined between the cylindrical main body of the end plug and the cylindrical bond portion of the end plug. In some such embodiments the end plug further has an annular groove in the cylindrical bond portion at the abrupt or gradual annular step defined between the cylindrical main body and the cylindrical bond portion. The end plug optionally further includes a stub protruding from the seat portion, the stub not contacting the cladding tube.

In accordance with another aspect, a nuclear fuel rod as set forth in the immediately preceding paragraph further includes a stack of fuel pellets comprising fissile material disposed in the cladding tube. An apparatus may include a pressure vessel containing a nuclear reactor core comprising an array of such nuclear fuel rods immersed in primary coolant water.

In accordance with another aspect, an end plug for plugging an end of a nuclear fuel rod cladding tube, the end plug includes: a tapered tip at one end of the end plug; a cylindrical bond portion sized to form an interference fit inside the end of the nuclear fuel rod cladding tube; and a seat portion of reduced diameter compared with the cylindrical bond portion at the opposite end of the end plug from the tapered tip. In some embodiments the end plug further includes a cylindrical main body of diameter $D_1$ disposed between the tapered tip and the cylindrical bond portion, and the cylindrical bond portion has diameter $D_2$ which is less than diameter $D_1$ of the cylindrical main body. In some such embodiments the seat portion comprises a cylindrical seat portion having diameter $D_3$ which is less than diameter $D_2$ of the cylindrical bond portion, while in other such embodiments the seat portion comprises a chamfered or frustoconical end of the cylindrical seat portion.

BRIEF DESCRIPTION OF THE DRAWINGS

The invention may take form in various components and arrangements of components, and in various process operations and arrangements of process operations. The drawings are only for purposes of illustrating preferred embodiments and are not to be construed as limiting the invention.

DETAILED DESCRIPTION OF THE PREFERRED EMBODIMENTS

Figure 1:
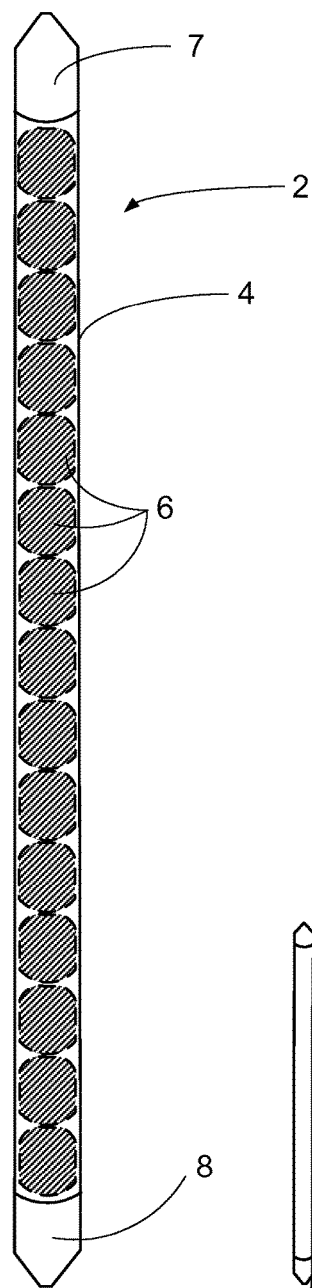
FIG. 1 diagrammatically shows an illustrative fuel rod including upper and lower end plugs.

With reference to FIG. 1, a fuel rod 2 is diagrammatically shown. The fuel rod 2 includes a cladding tube 4 containing a stack of fuel pellets 6 comprising fissile material. The cladding tube is plugged at its upper end with an upper end plug 7, and is plugged at its lower end with a (lower) end plug 8. The plugging of the lower end by a lower end plug 8, or the upper end by a upper end plug 7 includes a resistance weld as disclosed herein. The fuel rod may optionally contain other elements such as spacers not containing fissile material, or containing a reduced concentration of fissile material as compared with the fuel pellets.

Figure 2:
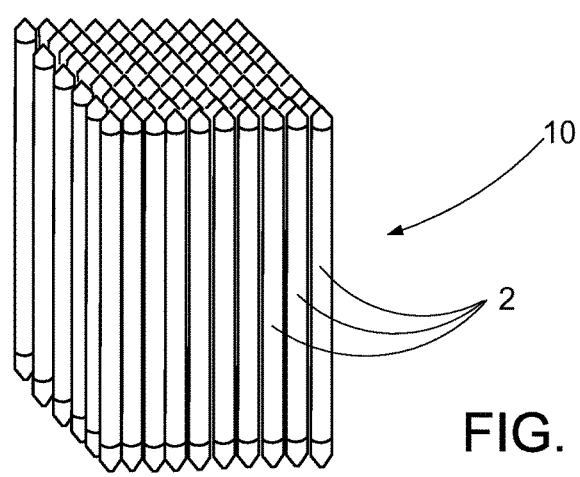
FIG. 2 diagrammatically shows a nuclear reactor core comprising fuel rods as shown in FIG. 1.

With reference to FIG. 2, a nuclear reactor core 10 is diagrammatically shown, and comprises an array of fuel rods 2. While the illustrative core 10 includes only a 10×10 array of 100 fuel rods, a reactor for generating electrical power may employ thousands or tens of thousands of fuel rods, typically arranged in structural groups called fuel assemblies. For example, one contemplated small modular reactor (SMR) design may include up to 69 fuel assemblies each comprising a 17×17 bundle of fuel rods. The fuel rods of each fuel assembly are typically held together by spacer grids welded with guide tubes and upper and lower nozzles or end plates to form the structural skeleton, and a core basket core former, or other structural support contains the fuel assemblies (structural support components not shown).

Figure 3:
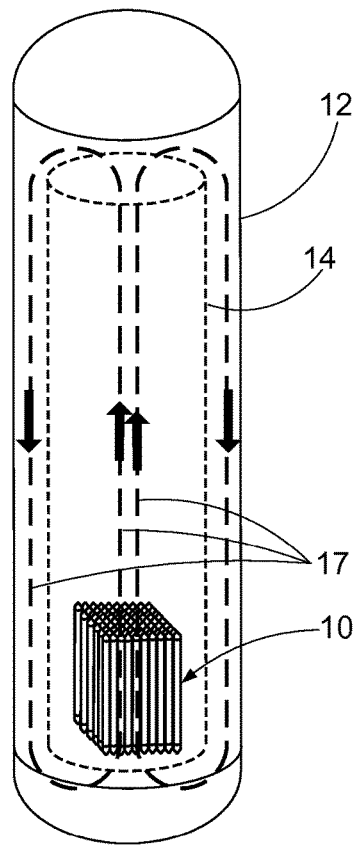
FIG. 3 diagrammatically shows a nuclear reactor including the nuclear reactor core of FIG. 2.

With reference to FIG. 3, a nuclear reactor is diagrammatically shown, and includes the nuclear reactor core 10 disposed in a pressure vessel 12 and immersed in primary coolant water. In the illustrative reactor of FIG. 3 a central riser structure 14 defines primary coolant flow circulation paths 17 which may be driven by natural circulation (that is, convection currents due to heating by the reactor core 10) or by internal or external reactor coolant pumps (not shown). The circulation paths 17 entail primary coolant heated by the reactor core 10 flowing upward through the interior plenum of the central riser 14 (the "hot" leg) and back downward to return to the core 10 via a downcomer annulus defined between the pressure vessel 12 and central riser 14 (the "cold" leg). The nuclear reactor optionally includes various other components not shown in FIG. 3, such as control rods and associated control rod drive mechanisms (CRDMs), optional reactor coolant pumps, an internal or external pressurizer, coolant makeup and letdown sub-systems, emergency core cooling systems (EGGS), an external containment structure, and so forth.

Figure 4:
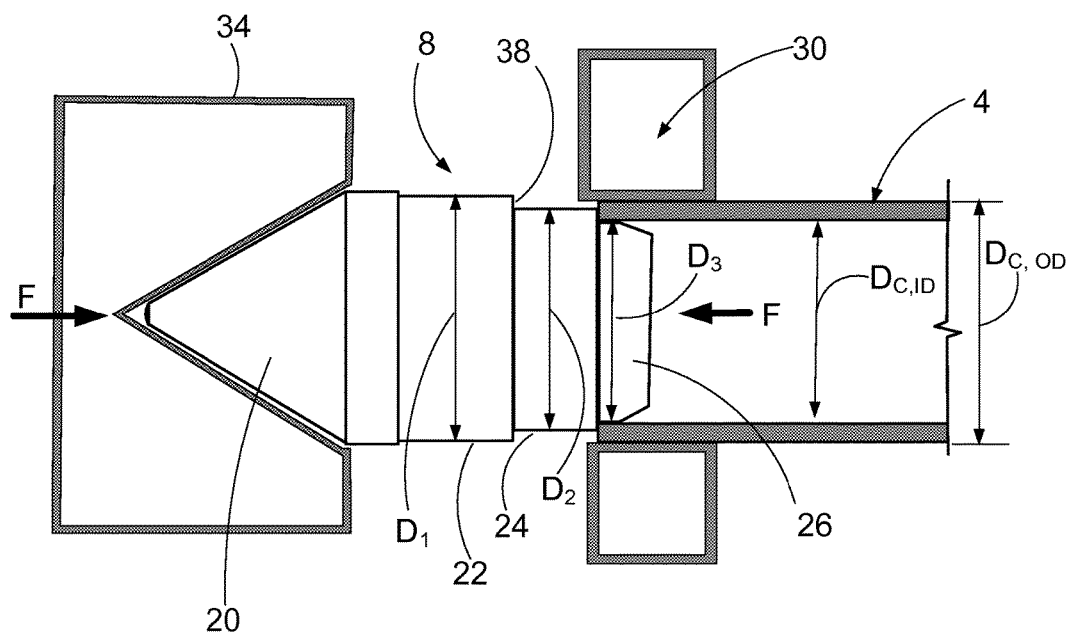
FIG. 4 shows a sectional view of an end plug with a fuel rod cladding seated for resistance welding.
Figure 5:
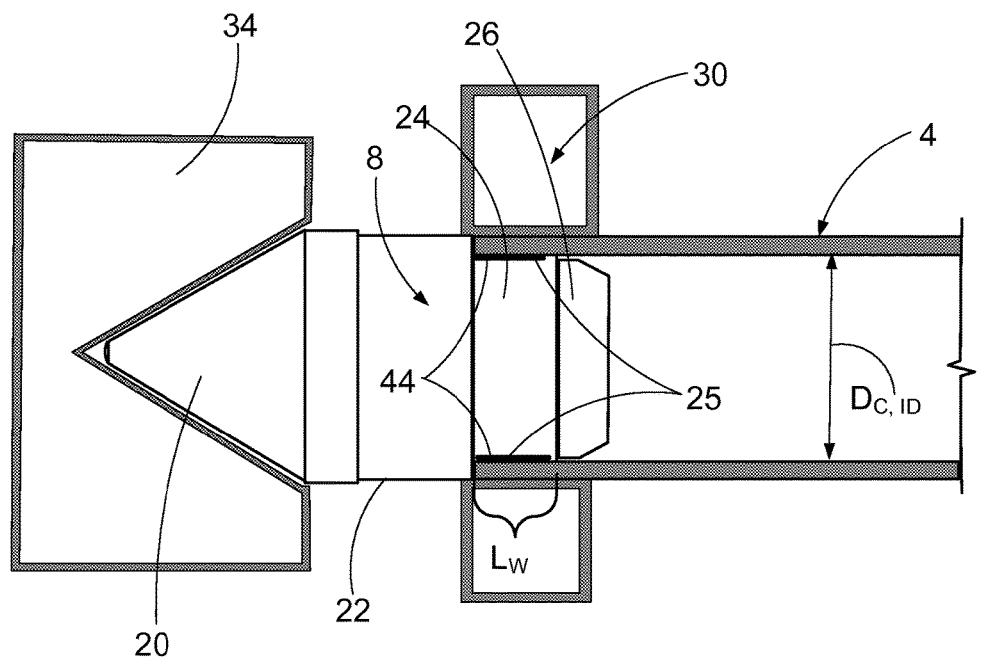
FIG. 5 shows a sectional view of the end plug/cladding of FIG. 4 after performing the resistance welding.

With reference to FIGS. 4 and 5, an illustrative resistance welding process is shown for welding the lower end plug 8 to the cladding tube 4. The lower end plug 8 is generally cylindrical and includes a main body comprising a tapered (e.g. conical) end 20, a cylindrical main body 22, a cylindrical bonding portion 24, and a cladding seat 26 which in the embodiment of FIGS. 4 and 5 is a chamfered end of the cylindrical bonding portion 24. In the end plug 8 of FIGS. 4 and 5, the cylindrical main body 22, cylindrical bonding portion 24, and cladding seat 26 comprise three successively smaller cylindrical portions of respectively smaller diameters $D_1 > D_2 > D_3$ extending between the tapered end 20 at one end of the end plug 8 and the cladding seat 26 at the opposite end of the end plug 8. The cladding seat 26 has a reduced diameter as compared with the diameter $D_2$ of the cylindrical bonding portion 24, e.g. comprising a chamfered or frustoconical end of the end plug 8. The reduced-diameter cladding seat 26 is sized to be received fully (as shown in FIG. 4) or partway into an open end of the cladding tube 4 that is to be plugged by the end plug 8. The chamfered or frustoconical end of the cladding seat 26 provides alignment and lead-in for the cladding tube 4 during the resistance welding. The cylindrical bonding portion 24 is sized to form an interference fit within the cladding tube 4. To this end, the cylindrical bonding portion 24 has the same diameter or slightly larger diameter than the inside diameter $D_{C,ID}$ of the end of the cladding tube 4. In some embodiments, the diameter $D_2$ of the cylindrical bonding portion 24 has a diameter that is 0.002 to 0.004 inches larger than the inside diameter $D_{C,ID}$ of the end of the cladding tube 4.

To perform the resistance welding, an electrode is attached to each of the end plug 8 and the cladding tube 4. In illustrative FIGS. 4 and 5, a cladding electrode 30 is a clamshell-type electrode that clamps onto the end of the cladding tube 4. In an alternative configuration, the cladding electrode 30 can be sized to engage the cladding tube end 4 with an interference fit between the cladding electrode 30 and the cladding tube 4 securing the cladding tube 4 in the electrode 30. The interference fit can be on the order of 0.0002 to 0.0020 inches, for example. An end plug electrode 34 can include a divot or other mating recess that is configured to receive the tapered end 20 of the end plug 8.

With the cladding tube 4 and end plug 8 attached to their respective electrodes 30, 34, the open end of the cladding tube 4 is clamped against the end plug 8. The clamping is diagrammatically indicated in FIG. 4 by arrows F. With the clamping F applied, an electrical current is applied between the electrodes 30, 34 and flows between the cladding tube 4 and the end plug 8 while the cladding tube 4 and end plug 8 are compressively loaded or clamped together. Electrical resistance is expected to be highest at the interface between the cladding tube 4 and the end plug 8. This resistance causes resistive heating of the mating surfaces. The combination of the clamping F and the applied electric current is effective to force the open end of the cladding tube 4 over the cladding seat 26 and to slide over the cylindrical bond portion 24 of the end plug 8 and to generate a resistance weld 25 (see FIG. 5) between a cylindrical bonding surface of the cylindrical bond portion 24 of the end plug 8 and the inside surface of the open end of the cladding tube 4. To achieve this effect, the clamping force F is approximately 200-800 pounds in some embodiments, for example. The combination of the compressive force and heating of the components results in the inside diameter of the cladding tube 4 sliding over the outside diameter $D_2$ of the cylindrical bond portion 24 of the end plug 8. To facilitate this, the inside diameter of the cladding tube 4 is urged radially outwardly over the cylindrical bond surface (24). The heating due to the electrical resistance at the plug/cladding interface causes the metal to soften and, under the compressive force, the cylindrical bond portion 24 of the end plug 8 slides into the cladding tube 20. The sliding continues until the cladding tube 4 reaches the radially outwardly extending shoulder 38 of the end plug 8 between the smaller diameter bonding surface 24 and a larger diameter cylindrical surface of the main body 22 of the end plug 8. The shoulder 38 is thus a slide stop 38 defined between the main body 22 of the end plug 8 and the cylindrical bond portion 24 of the end plug. The slide of the open end of the cladding tube 4 over the cylindrical bond portion 24 of the end plug 8 is stopped by the slide stop. Alternatively, the slide of the tube over the end plug may be controlled by limiting the travel of the plug or by the process itself.

The diameter $D_1$ of the main body 22 of the end plug 8 is preferably only slightly larger than the diameter $D_2$ of the cylindrical bond portion 24. In some embodiments the diameter $D_1$ of the main body 22 of the end plug 8 is equal to an outer diameter $D_{C,OD}$ of the cladding 4, so that in the welded configuration (FIG. 5) the outer surface of the fuel rod has the same outer diameter across the transition from the cladding 4 to the welded end plug 8.

As the cladding tube 4 slides over the cylindrical bond portion 24 of the end plug 8, some material, from the end plug 8 and/or from the cladding tube 4, builds up at the leading edge of the interface between the two components. This buildup 44 is shown diagrammatically in FIG. 5. In some embodiments (see FIGS. 8 and 9), a groove in the end plug 8 (for example, at the location identified generally by reference numeral 44) is provided to accept the buildup, and/or a chamfer can be added to the radially outwardly extending seating shoulder to urge upset material outwardly. In general, the welding process is self-cleaning as impurities are displaced with the upset material (i.e., buildup 44) as the cladding slides over the cylindrical bond portion 24 of the end plug 8. Moreover, the bond length of the weld 25 is large, e.g. corresponding to the axial length $L_w$ of the cylindrical bond portion 24 as indicated in FIG. 5.

With reference to FIGS. 6-9, other illustrative end plug configurations are illustrated, which include a cladding seat and cylindrical bond portion and are generally suitable for welding to cladding tubes in a similar manner as the end plug 8 shown and described in FIGS. 4-5. In addition, the various features of each end plug are generally interchangeable such that features shown in one embodiment can be included in other embodiments as desired. The end plugs of FIGS. 6-9 each include the main body comprising the tapered (e.g. conical) end 20 and cylindrical main body 22. Upper end plugs (not show) may include any upper end plug upper end portion in combination with any (one or more) of the main body, bonding, seat, recess, slide stop, or stub features disclosed herein with respect to a lower end plug feature. The cladding seat of each of the embodiments of FIG. 6-9 is modified versus the end plug 8 of FIGS. 4-5 to include a stub 48. The stub 48 is an optional feature that, if included, provides a connection point for connecting a spacer element (not shown) for spacing the fuel pellets 6 (see FIG. 1) from the end plug.

Figure 6:
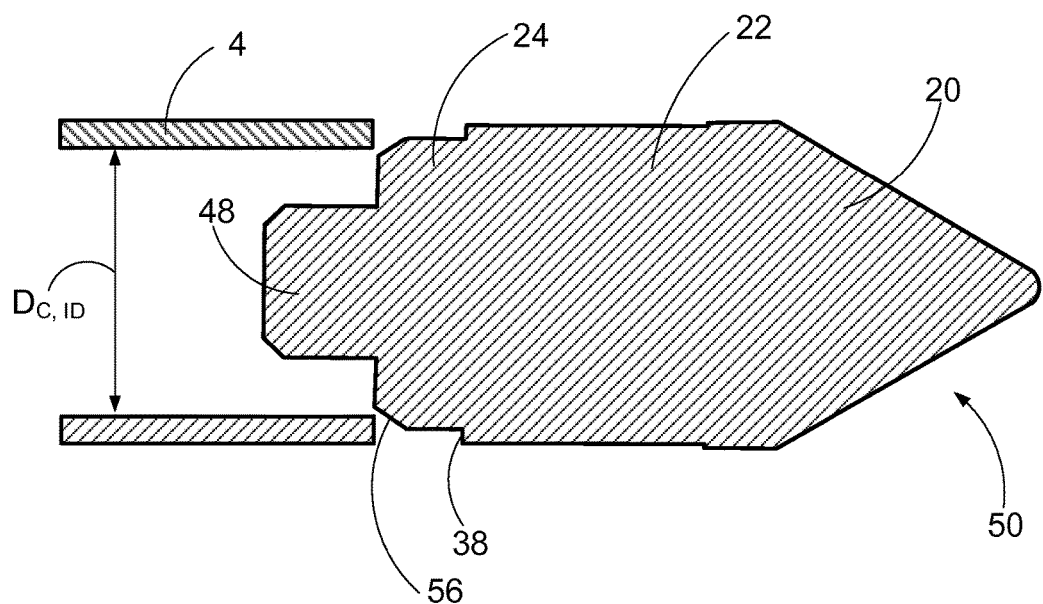
FIGS. 6-9 show cross-sectional views of additional end plug embodiments suitable for resistance welding to a fuel rod cladding as disclosed herein.

With reference to FIG. 6, an end plug 50 is illustrated that is similar to end plug 8, and includes the conical end 20, cylindrical main body 22, and cylindrical bond portion 24 with reduced diameter compared with the main body 22, and the slide stop 38 defined as an abrupt step between the main body 22 and the cylindrical bond portion 24. However, the cladding seat 26 of the embodiment of FIGS. 4 and 5, which has an abrupt reduction from diameter $D_2$ to diameter $D_3$, is replaced in the end plug 50 of FIG. 6 by a modified cladding seat 56 comprising a frustoconical or chamfered structure having gradually reducing diameter with increasing distance from the cylindrical bond portion 24. The chamfered or frustoconical shape of the cladding seat 56 facilitates urging the cladding radially outward as it is forced over the cladding seat 56 and slides onto the cylindrical bond portion 24 during the resistance welding. At the point where the cladding seat 56 joins the cylindrical bond portion 24, the radius of the cladding seat 56 should be equal to or slightly smaller than the diameter of the cylindrical bond portion 24 but should also be larger than the inner diameter $D_{C,ID}$ of the cladding 4 so as to capture and seat the end of the cladding 4.

Figure 7:
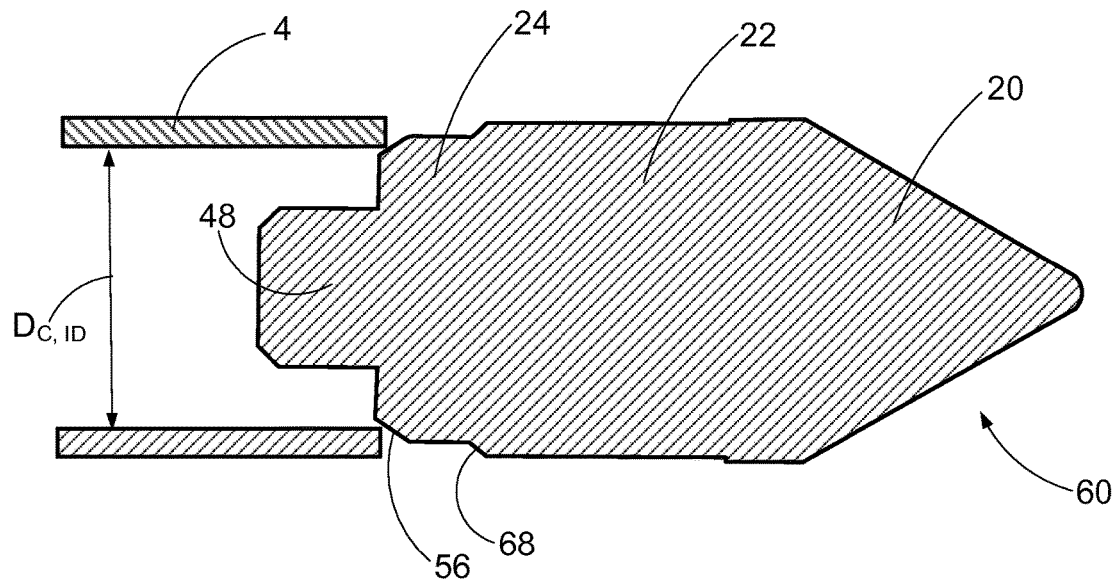

With reference to FIG. 7, an illustrative end plug 60 is illustrated that is similar to end plug 50 of FIG. 6, and includes the conical end 20, cylindrical main body 22, cylindrical bond portion 24 with reduced diameter compared with the main body 22, and chamfered or frustoconical cladding seat 56. However, the end plug 60 of FIG. 7 differs from the end plug 50 of FIG. 6 in that the slide stop 38, which is an abrupt step between the main body 22 and the cylindrical bond portion 24 in the embodiments of FIGS. 4-5 and 6, is a gradual-step slide stop 68 in the embodiment of FIG. 7. The illustrative gradual-step slide stop 68 is a 45° chamfer; however, other angles are contemplated. The gradual slide stop 68 advantageously provides space for the buildup. In contrast, the abrupt-edge slide stop 38 of FIGS. 4-5 and 6 can act as a trap for the buildup.

Figure 8:
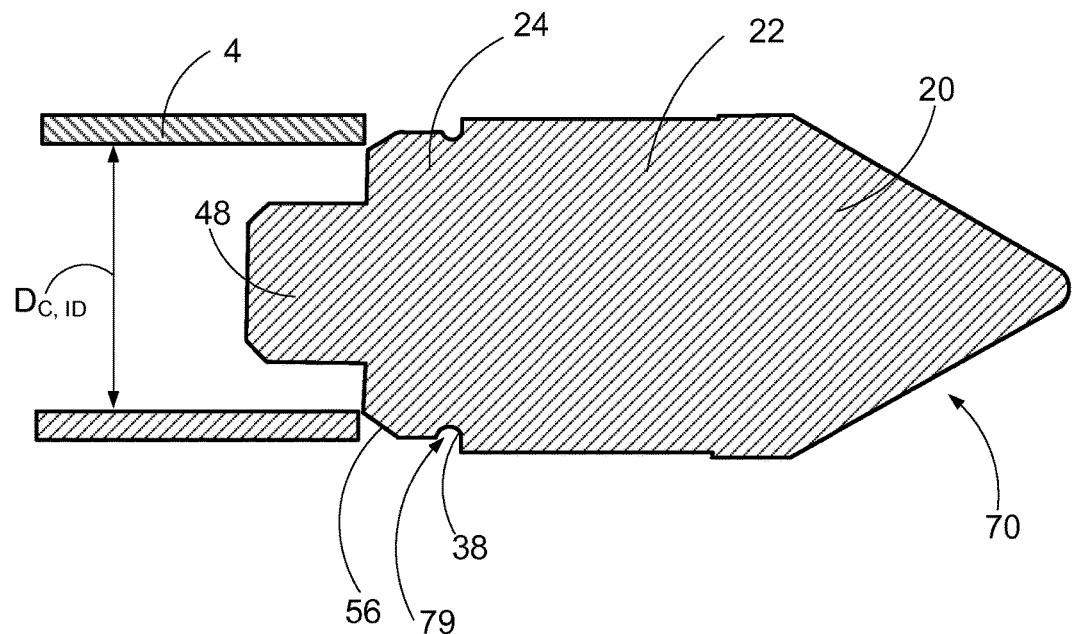

With reference to FIG. 8, an illustrative end plug 70 is illustrated that is similar to end plug 50 of FIG. 6, and includes the conical end 20, cylindrical main body 22, cylindrical bond portion 24 with reduced diameter compared with the main body 22 defining the abrupt-step slide stop 38, and chamfered or frustoconical cladding seat 56. However, the end plug 70 of FIG. 8 differs from the end plug 50 of FIG. 6 in that an annular recess or groove 79 is provided at the base of the abrupt-step slide stop 38 to receive buildup generated during the resistance welding process. The annular recess or groove 79 is located proximate to where the leading edge of the cladding tube 4 meets the slide stop 38 to accept the buildup. The recess or groove 79 reduces the outward "pileup" of the buildup on the exterior of the fuel rod. Any remaining excess filler can be removed mechanically.

Figure 9:
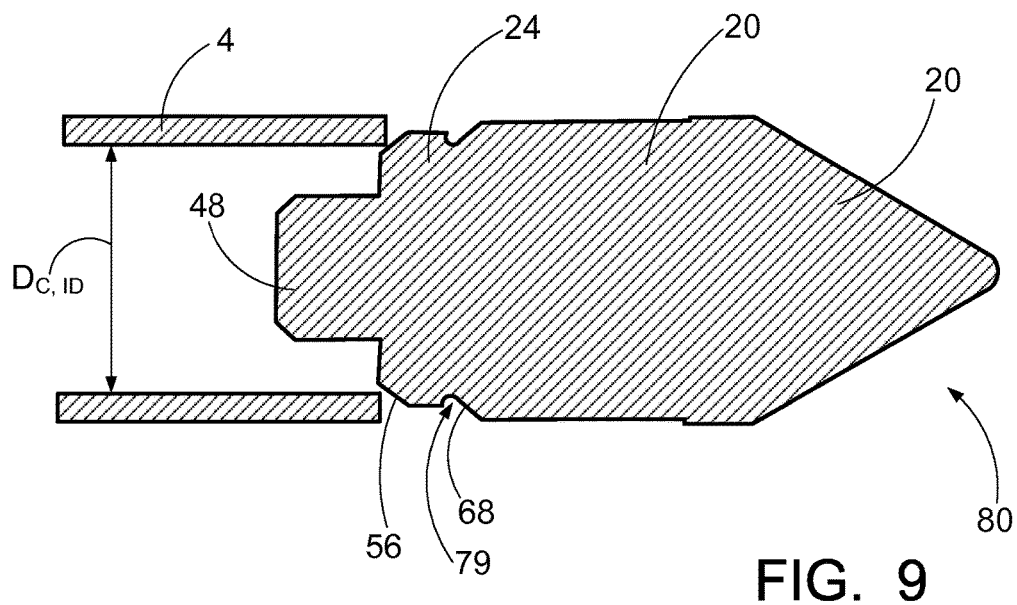

With reference to FIG. 9, an illustrative end plug 80 is a composite of the end plugs 70, 80 of FIGS. 7 and 8, and includes the conical end 20, cylindrical main body 22, cylindrical bond portion 24 with reduced diameter compared with the main body 22 defining the gradual-step slide stop 68 (as in the end plug 60 of FIG. 7), and chamfered or frustoconical cladding seat 56, and further includes the recess or groove 79 (as in the end plug 70 of FIG. 8).

The abrupt-step slide stop 38 or gradual-step slide stop 68 advantageously provides a definite termination for the slide of the cladding 4 over the cylindrical bond portion 24. However, it is contemplated to omit the slide stop entirely. In such embodiments, the slide of the cladding 4 over the cylindrical bond portion 24 is terminated due to force from an interference fit between the cladding 4 and the cylindrical bond portion 24, possibly in combination with incipient weld interfacing forming between the cladding 4 and the cylindrical bond portion 24 as the sliding increase the total contact surface area resulting in reduced resistive heating. The resistance welding is a dynamic process that is difficult to model. Accordingly, determination of process parameters such as the inside diameter $D_{C,ID}$ of the cladding 4, the outer diameter $D_2$ of the cylindrical bonding portion 24, the clamping force F, and the electrical current suitable to produce the desired slide stopping force is contemplated to be determined by trial-and-error using an experimental resistance welding apparatus.

The resistance welding process disclosed herein has numerous advantages. For example, the welding process is self-cleaning as impurities are displaced with the buildup material as the cladding slides over the cylindrical bonding portion 24 of the end plug. In addition, the bond length $L_w$ can be significantly longer than the cladding tube thickness (e.g., twice as long or more), providing a strong weld. The resulting bond line is parallel to the surface of the cladding 4, which can facilitate non-destructive examination of the weld bond. The resulting weld does not protrude above the cladding surface, and in some embodiments no post-weld machining is performed to smooth the surface. (Alternatively, if the gradual-step slide stop 68 and/or groove 79 is insufficient to fully contain the buildup, some post-weld machining to remove the excess buildup is contemplated). The weld quality can be monitored and controlled on the basis of welding process parameters such as electrical current, voltage, displacement, weld time and weld clamping force. Moreover, the abrupt-step cladding seat 26 or the gradual-step (e.g., chamfered or frustoconical) cladding seat 56 provides secure and well-centered seating of the cladding 4 against the end of the end plug, which substantially enhances robustness, reliability, and yield. The precise centering of the cladding seating also facilitates the use of the illustrative spacer connection stub 48, as the centering of the cladding ensures that the cladding does not come into contact with or interfere with the positioning of the spacer on the stub 48. The stub 48 is suitably sized and shaped to not contact the open end of the cladding tube 4 during the plugging process (i.e., as the end plug is resistance welded to the cladding tube 4).

The preferred embodiments have been illustrated and described. Obviously, modifications and alterations will occur to others upon reading and understanding the preceding detailed description. It is intended that the invention be construed as including all such modifications and alterations insofar as they come within the scope of the appended claims or the equivalents thereof.

We claim:

1. A method comprising:
   plugging an open end of a cladding tube of a nuclear fuel rod with an end plug having a main body, a cylindrical bond portion extending from the main body and terminating in a cladding seat including a cylindrical seat portion of reduced diameter compared with the cylindrical bond portion, and an abrupt or gradual annular step between the cylindrical seat portion of the end plug and the cylindrical bond portion of the end plug, the plugging including:
   clamping the open end of the cladding tube in a clamp against the cladding seat of the end plug; and
   while clamping, applying electrical current between the end plug and the open end of the cladding tube, the combination of the clamping and the applied electric current including:
   forcing the open end of the cladding tube over the cladding seat;
   sliding the open end of the cladding tube over the cylindrical bond portion of the end plug so that the cylindrical bond portion is received entirely within the cladding tube;
   generating a resistance weld between a cylindrical bonding surface of the cylindrical bond portion of the end plug and the inside surface of the open end of the cladding tube; and
   preventing the outer diameter of the open end of the cladding tube, and the resistance weld, from expanding during the sliding of the open end of the cladding tube over the cylindrical bond portion of the end plug.

2. A method as set forth in claim 1, wherein the cladding seat further comprises a chamfered or frustoconical end.

3. A method as set forth in claim 1, wherein the end plug includes a slide stop defined between the main body of the end plug and the cylindrical bond portion of the end plug, the slide of the open end of the cladding tube over the cylindrical bond portion of the end plug being stopped by the slide stop.

4. A method as set forth in claim 3, wherein the slide stop includes an annular groove that receives buildup material displaced during the slide of the open end of the cladding tube over the cylindrical bond portion of the end plug.

5. A method as set forth in claim 3, wherein the slide stop is an abrupt or gradual annular step between the cylindrical bond portion of the end plug and the main body of the end plug.

6. A method as set forth in claim 1, wherein the end plug includes an annular groove arranged to receive buildup material displaced during the slide of the open end of the cladding tube over the cylindrical bond portion of the end plug.

7. A method as set forth in claim 1, wherein the clamp is a cladding tube electrode for the applying of electrical current between the end plug and the open end of the cladding tube.

8. A method as set forth in claim 7, wherein the main body of the end plug includes a tapered tip located outside of the cladding tube after the plugging, and the plugging further includes:
   inserting the tapered tip of the main body of the end plug into a mating recess of an end plug electrode for the applying of electrical current between the end plug and the open end of the cladding tube.

9. A method as set forth in claim 8, wherein the clamping is performed using the cladding tube electrode to apply force to the open end of the cladding tube and using the end plug electrode to apply force to the end plug.

10. A method as set forth in claim 1, wherein the cylindrical bond portion has a diameter greater than an inside diameter of the open end of the cladding tube.

11. A method as set forth in claim 1, wherein the end plug further includes a stub protruding from the cladding seat, the stub sized and shaped to not contact the open end of the cladding tube during the plugging.

12. A method as set forth in claim 1, further comprising:
   loading fuel pellets comprising fissile material into the cladding tube.

13. A method as set forth in claim 12, further comprising:
   repeating the loading and the plugging for each of a plurality of cladding tubes to generate a plurality of assembled nuclear fuel rods;
   constructing a fuel assembly comprising an array of the assembled nuclear fuel rods.

\* \* \* \* \*